United States Patent
Na et al.

(10) Patent No.: US 9,817,495 B2
(45) Date of Patent: Nov. 14, 2017

(54) APPARATUS FOR DISPLAYING A CHANGED IMAGE STATE AND METHOD OF CONTROLLING THE SAME

(71) Applicant: LG ELECTRONICS INC., Seoul (KR)

(72) Inventors: Sungchae Na, Seoul (KR); Taeyoung Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 227 days.

(21) Appl. No.: 13/956,934

(22) Filed: Aug. 1, 2013

(65) Prior Publication Data
US 2014/0035852 A1   Feb. 6, 2014

(30) Foreign Application Priority Data

Aug. 3, 2012 (KR) .................. 10-2012-0085088

(51) Int. Cl.
*G06F 3/041* (2006.01)
*G06F 3/0488* (2013.01)
*G09G 5/00* (2006.01)

(52) U.S. Cl.
CPC .......... *G06F 3/041* (2013.01); *G06F 3/04883* (2013.01); *G09G 5/00* (2013.01); *G09G 2340/045* (2013.01); *G09G 2340/0464* (2013.01); *G09G 2340/14* (2013.01); *G09G 2354/00* (2013.01); *H04M 2250/52* (2013.01)

(58) Field of Classification Search
CPC ............. G06F 3/04883; G06F 3/04842; G06F 17/30017; H04N 2201/0084; H04N 2201/0089

USPC ......................................................... 715/863
See application file for complete search history.

(56) References Cited

U.S. PATENT DOCUMENTS

| | | | |
|---|---|---|---|
| 5,999,173 A * | 12/1999 | Ubillos | G11B 27/034 348/E5.056 |
| 6,750,890 B1 * | 6/2004 | Sugimoto | 715/838 |
| 7,505,065 B2 * | 3/2009 | Oura et al. | 348/207.1 |
| 8,525,855 B1 * | 9/2013 | Freyhult | G06F 3/0481 345/660 |
| 2005/0008343 A1 | 1/2005 | Frohlich et al. | |
| 2006/0038908 A1 | 2/2006 | Yoshino | |
| 2008/0030598 A1 * | 2/2008 | Takagi | H04N 1/00458 348/231.7 |
| 2009/0268987 A1 * | 10/2009 | Tsuda | G06T 13/80 382/305 |

(Continued)

FOREIGN PATENT DOCUMENTS

| | | |
|---|---|---|
| CN | 101115141 A | 1/2008 |
| JP | 2003-317078 A | 11/2003 |

*Primary Examiner* — Jennifer To
*Assistant Examiner* — Terri Filosi
(74) *Attorney, Agent, or Firm* — Birch, Stewart, Kolasch & Birch, LLP

(57) ABSTRACT

An apparatus for displaying an image and including a display unit configured to display the image; an input unit configured to receive an input to change a state of displaying the image; and a controller configured to change the state of the displayed image, save history information including the changed state of the displayed image in a memory associated with the mobile terminal, receive a revival command for displaying the saved history information, and display the saved history information on the display unit.

14 Claims, 13 Drawing Sheets

(56) References Cited

U.S. PATENT DOCUMENTS

2010/0085316 A1* 4/2010 Kim .............................. 345/173
2010/0214321 A1* 8/2010 Hokkanen .......... H04N 1/00336
　　　　　　　　　　　　　　　　　　　　　　345/660
2010/0271547 A1* 10/2010 Kojima et al. ................ 348/552

* cited by examiner

APPARATUS FOR DISPLAYING A CHANGED IMAGE STATE AND METHOD OF CONTROLLING THE SAME

Pursuant to 35 U.S.C. §119(a), this application claims the benefit of earlier filing date and right of priority to Korean Patent Application No. 10-2012-0085088, filed on Aug. 3, 2012, the contents of which are hereby incorporated by reference herein in their entirety.

BACKGROUND OF THE INVENTION

Field of the Invention

The present invention relates to an image display device and controlling method thereof, and more particularly, to an apparatus for displaying an image and method of controlling the same. Although the present invention is suitable for a wide scope of applications, it is particularly suitable for providing more convenient functions in viewing video contents.

Discussion of the Related Art

The recently developed technology facilitates acquisition or production of various video contents and the frequency of viewing/sharing of the video contents tends has increased. This tendency is increasingly accelerated because of the supply of various image display devices including a smart phone and the like.

Generally, in viewing an image, a user can change a displayed state of the image to see a particularly interesting part, i.e., an interesting region of the image in detail or optimally by zoom-in (enlargement), scroll and the like. However, when the user later views the same image, the user may frequently check the previously-viewed interesting region. This is inconvenient for the user to change a displayed state of the image in a manner similar to that of the previous viewing. Such a similar inconvenience happens in taking a photo as well. Generally, a user checks a photographed state of a specific subject in a photographed image in a review mode right after taking the photo. In this instance, it is inconvenient for the user to change a displayed state of the photographed image to facilitate the checking of the photographed state of the specific subject each time the review mode is entered.

SUMMARY OF THE INVENTION

Accordingly, the present invention is directed to an image display device and controlling method thereof that substantially obviate one or more problems due to limitations and disadvantages of the related art.

One object of the present invention is to provide an apparatus for displaying an image and method of controlling the same, by which more convenient functions can be provided.

Another object of the present invention is to provide an apparatus for displaying an image and method of controlling the same, by which a specific part of an image checked in a previous viewing can be conveniently checked in a next viewing when the image is repeatedly viewed.

A further object of the present invention is to provide an apparatus for displaying an image and method of controlling the same, by which a specific part of a specific subject checked in a review mode in a previous photographing can be conveniently checked in a re-photographed image when the specific subject is repeatedly photographed.

Technical tasks obtainable from the present invention are not limited to the above-mentioned technical task. In addition, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for displaying an image according to one embodiment of the present invention may include a display unit configured to display the image, a user input unit configured to receive an input of at least one display state change command for changing a state of displaying the image, a memory configured to save a history information of the input at least one display state change command addition, and a controller controlling the state of displaying the image to be changed in accordance with the saved history information if a revival command is input via the user input unit.

In another aspect of the present invention, a method of controlling an image display device according to one embodiment of the present invention may include the steps of displaying an image via a display unit, receiving an input of at least one display state change command via a user input unit to change a state of displaying the image, saving a history information of the input at least one display state change command addition, and changing the state of displaying the image in accordance with the saved history information if a revival command is input.

In another aspect of the present invention, an apparatus for displaying an image according to another embodiment of the present invention may include a camera, a user input unit, a memory, a display unit, and a controller, if a first image is photographed via the camera, controlling the photographed first image to be displayed via the display unit in a review mode, the controller, if at least one display state change command for changing a state of displaying the first image is input via the user input unit, controlling a history information of the input at least one display state change command to be saved in the memory, the controller, if a second image is photographed via the camera, controlling the photographed second image to be displayed in the review mode, the controller, if a revival command is input via the user input unit, controlling a state of displaying the second image to be changed in accordance with the saved history information.

In a further aspect of the present invention, a method of controlling an image display device according to another embodiment of the present invention may include the steps of photographing a first image, displaying the photographed first image in a review mode, the controller, receiving an input of at least one display state change command for changing a state of displaying the first image via a user input unit, saving a history information of the input at least one display state change command addition, photographing a second image, displaying the photographed second image in the review mode, and if a revival command is input via the user input unit, changing a state of displaying the second image in accordance with the saved history information.

Effects obtainable from the present invention is non-limited by the above mentioned effect. In addition, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the disclosure only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
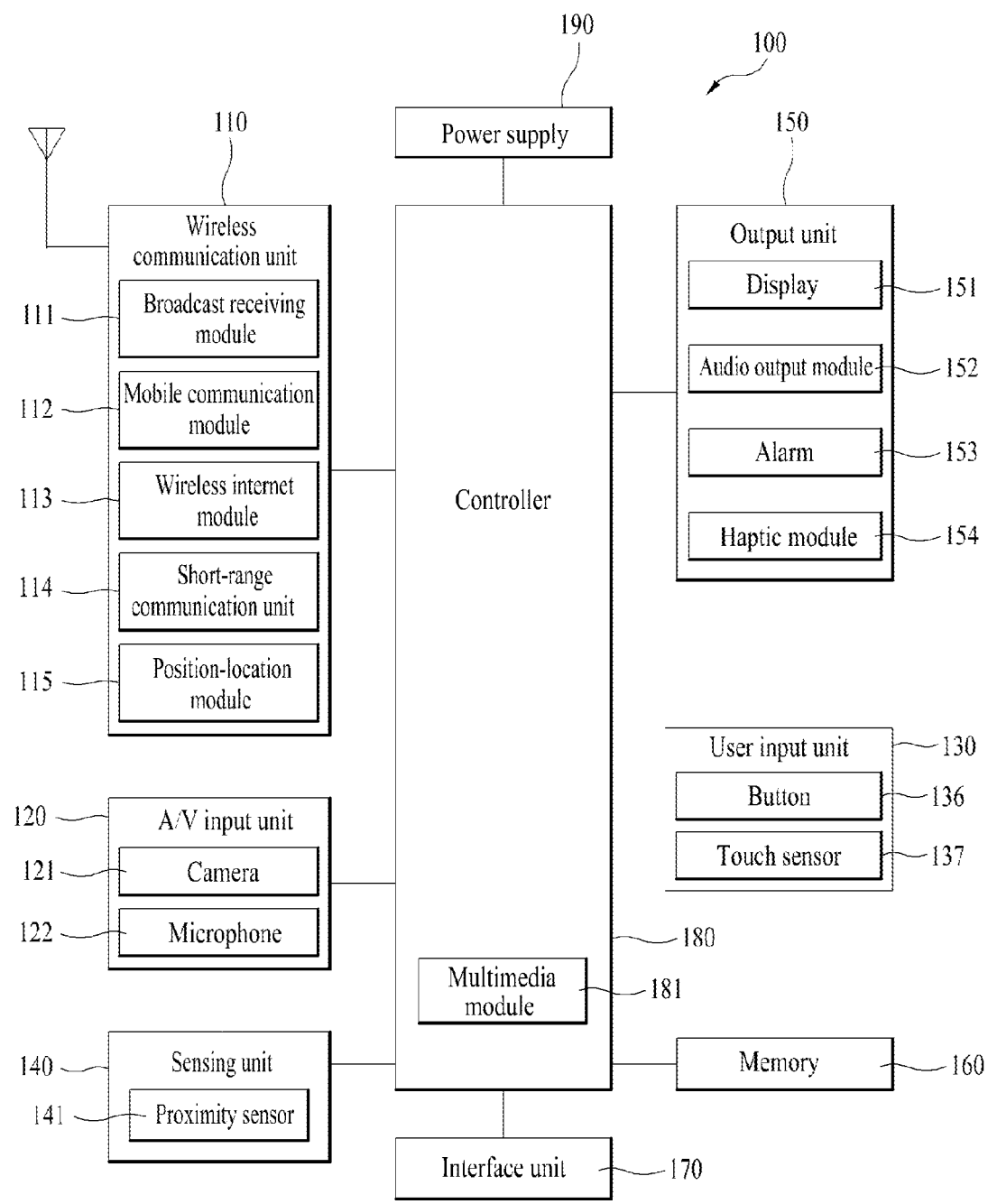
FIG. 1 is a block diagram of a mobile terminal according to one embodiment of the present invention.

FIG. 1 is a block diagram of a mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. In a non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™ to name a few.

The position-location module 115 identifies or otherwise obtains the location of the mobile terminal 100. According to one embodiment, this module may be implemented with a global positioning system (GPS) module. The GPS module 115 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 can calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136, a touch sensor 137, a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100. As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, the proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. In addition, a position, at which the proximity touch is made to the touchscreen using the pointer, may mean a position of the pointer vertically corresponding to the touchscreen when the pointer makes the proximity touch.

The proximity sensor 141 detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 can output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160. Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 can operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2:
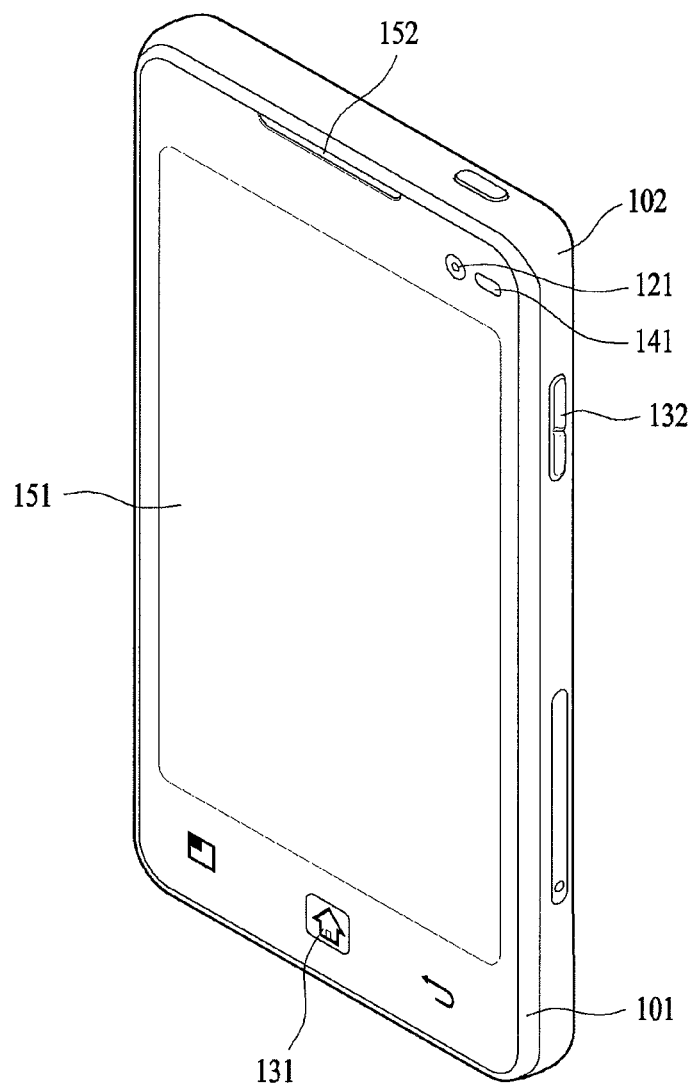
FIG. 2 is a front perspective diagram of a mobile terminal according to one embodiment of the present invention.

Next, FIG. 2 is a front perspective view of a mobile terminal according to one embodiment of the present invention. The mobile terminal 100 illustrated in FIG. 2 has a bar type terminal body. However, the mobile terminal 100 may be implemented in a variety of different configurations. Examples of such configurations include folder-type, slide-type, rotational-type, swing-type and combinations thereof. For ease of description, the following disclosure will primarily relate to a bar-type mobile terminal 100. However, it is understood that such disclosure may apply equally to other types of mobile terminals.

Referring to FIG. 2, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130 (see FIG. 1).

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132.

Meanwhile, such a graphic for pointing at a specific object on a display unit or selecting a menu from the display unit as an arrow, a finger and the like is called a pointer or a cursor. However, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

Saving & Reviving a Display State Changed History of Image

According to one embodiment of the present invention, a user saves a history of changing a displayed state of an image in viewing the image. In a next viewing, an image display state can be conveniently changed in the same manner of the previous viewing using the saved information.

Figure 3:
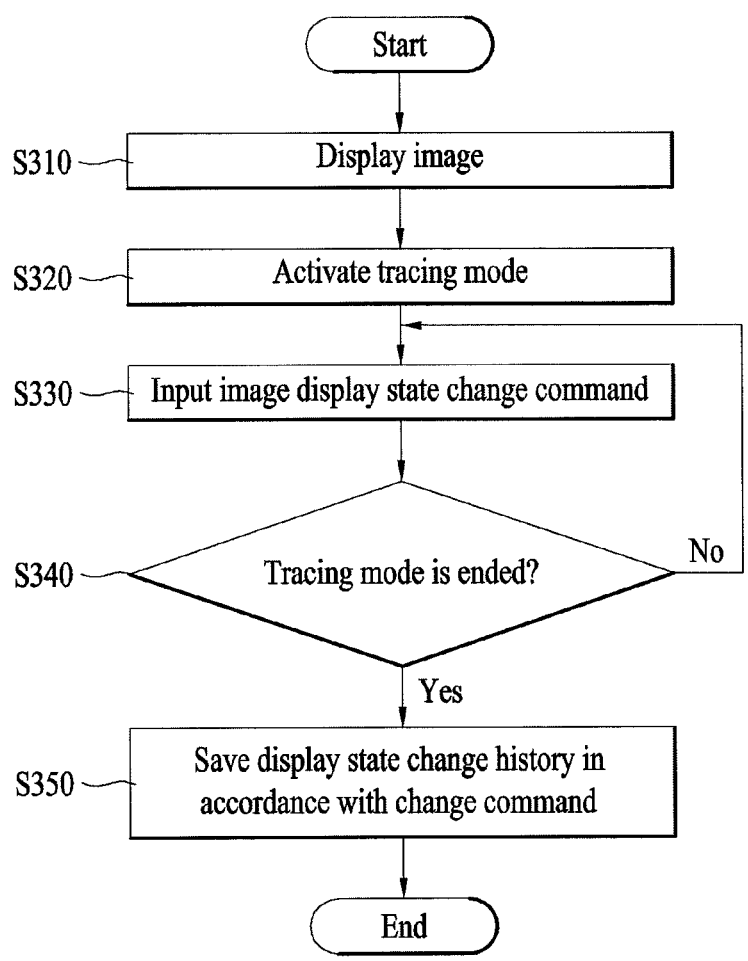
FIG. 3 is a flowchart illustrating one example of a method of saving an image display state changed history in a mobile terminal according to one embodiment of the present invention.

FIG. 3 is a flowchart illustrating one example of a method of saving an image display state changed history in a mobile terminal according to one embodiment of the present invention. Referring to FIG. 3, in an image outputtable state in which the mobile terminal can output an image via the touchscreen 151, one image can be displayed (S310).

In this instance, the image outputtable state may mean a state that an application, which can change a state (e.g., enlarge, reduce, scroll, rotate, etc.) of a random image displayed on the touchscreen in response to a user's command input, is active. Alternatively, the image outputtable state may mean a state that a mode of providing a function corresponding to it has been entered in an operating system.

When the image is displayed, a tracing mode can be activated in response to a user's command input via the user input unit 130 (S320). Alternatively, the tracing mode can be activated if a prescribed activation condition determined by the controller 180 is met. In this instance, the tracing mode means a mode in which the controller 180 traces how a displayed state of an image is changed in response to a command input by a user. This mode may be named a gesture tracing mode because a gesture substantially taken by a user using a pointer is traced and saved in case of receiving a command for inputting a displayed state of an image from the user via the touchscreen 151.

Once the tracing mode is active, the controller 180 receives at least one command for changing an image display state via the touchscreen 151 and/or the user input unit 130 (S330). If the tracing mode is ended (S340), the controller 180 can control an information (hereinafter called change history information) on an image display state changed history to be saved in the memory 160 in response to a command input by a user (S350).

In this instance, the change history information may be saved in an image file itself or saved as a separate file. Of course, this saving action is performed in the step S350, which means the completion of the change history information only. In addition, the change history information can be saved by being cumulatively updated each time a command for changing a displayed state of an image from a user is recognized. Moreover, the change history information can be configured with coordinates (movement) information and display magnification information, with a user-input command itself (e.g., a track of a recognized touch input, etc.) recognized by the controller 180, or with a combination of the two configurations.

The command for changing the displayed state can be given by manipulating the hardware key button 130 or performed in response to a type of a touch pattern input onto the touchscreen 151. For instance, a scroll command can be performed by a touch-drag input or a flicking touch input to a touchscreen. In another instance, an enlarge/reduce command can be performed by inputting a multi-touch to two different points and then varying a distance between the two different points by maintaining the multi-touch. Besides, the tracing mode can be instantly activated as soon as a command for changing an image display state is input.

In the following description, a detailed example of performing a tracing mode via an image play application is explained with reference to FIG. 4. In particular, FIG. 4 is a diagram illustrating one example of a process for activating and ending a tracing mode through an image play application in a mobile terminal according to one embodiment of the present invention.

Figure 4:
FIG. 4 is a diagram illustrating one example of a process for activating and ending a tracing mode through an image play application in a mobile terminal according to one embodiment of the present invention.

Referring to FIG. 4, as an image play application is activated, thumbnail images corresponding to images displayable via the corresponding application are displayed on the touchscreen 151 (FIG. 4(*a*)). In doing so, if a prescribed thumbnail image 410 is selected, an image corresponding to the selected thumbnail image 410 can be displayed as a full screen (FIG. 4(*b*)). In doing so, a trash icon 421 for deleting a corresponding image and a tracing activate icon 423 for activating a tracing mode can be arranged on one side of the touchscreen 151.

If the tracing activate icon 423 is selected, the tracing mode is activated to initiate a tracing of a history of a displayed state of a corresponding image changed by a user. Referring to FIG. 4(*c*), the tracing activate icon 423 can be changed into an icon 425 indicating that the tracing mode is active. FIG. 4(*c*) shows a state that an enlarge command is input in the state shown in FIG. 4(*b*) to display a first portion of the image.

Further, FIG. 4(*d*) shows a state that a scroll command is input in a left direction in the state shown in FIG. 4(*c*) to display a second portion of the image. In this instance, instead of selecting the tracing activate icon 423 in the situation shown in FIG. 4(*b*), the tracing mode can be activated, as shown in FIG. 4(*c*), as soon as the enlarge command is input.

While the tracing mode is active, if the image returns to an initial display state, as shown in FIG. 4(*e*), the tracing mode can be ended. In addition, an indication message 430, which indicates that the tracing mode was ended and that change history information has been saved, can be displayed. When the indication message 430 is displayed, the icon 425 indicating that the tracing mode is active disappears and the trash icon 421 can be displayed again. Moreover, as the change history information on the corresponding image exists, a change history play icon 427 for reviving a previously performed image display state change in accordance with the change history information can be displayed.

After the tracing mode has ended, and if a user command for changing an image display state of the same image is received, the controller 180 can re-activate the tracing mode. Moreover, even if the image returns to the initial display state, the controller 180 can stand by for an occurrence of an additional command input for the image without ending the tracing mode.

Alternatively, instead of making an image return to a previous display state, referring to FIG. 4(f), if it returns to the state of displaying the displayable thumbnail image, the tracing mode can be ended. In this instance, the indication message 430, which indicates that the tracing mode was ended and that change history information has been saved, can be displayed as well. Moreover, an indicator 411, which indicates that the change history information exists, can be displayed on the thumbnail of the corresponding image.

Meanwhile, when the same display state is maintained over a predetermined duration, the controller 180 recognizes it as an intention to save the corresponding display state and may then activate a tracing mode. This operation is described with reference to FIG. 5 as follows. In particular, FIG. 5 is a diagram illustrating another example of a process for activating a tracing mode through an image play application in a mobile terminal according to one embodiment of the present invention.

Figure 5:
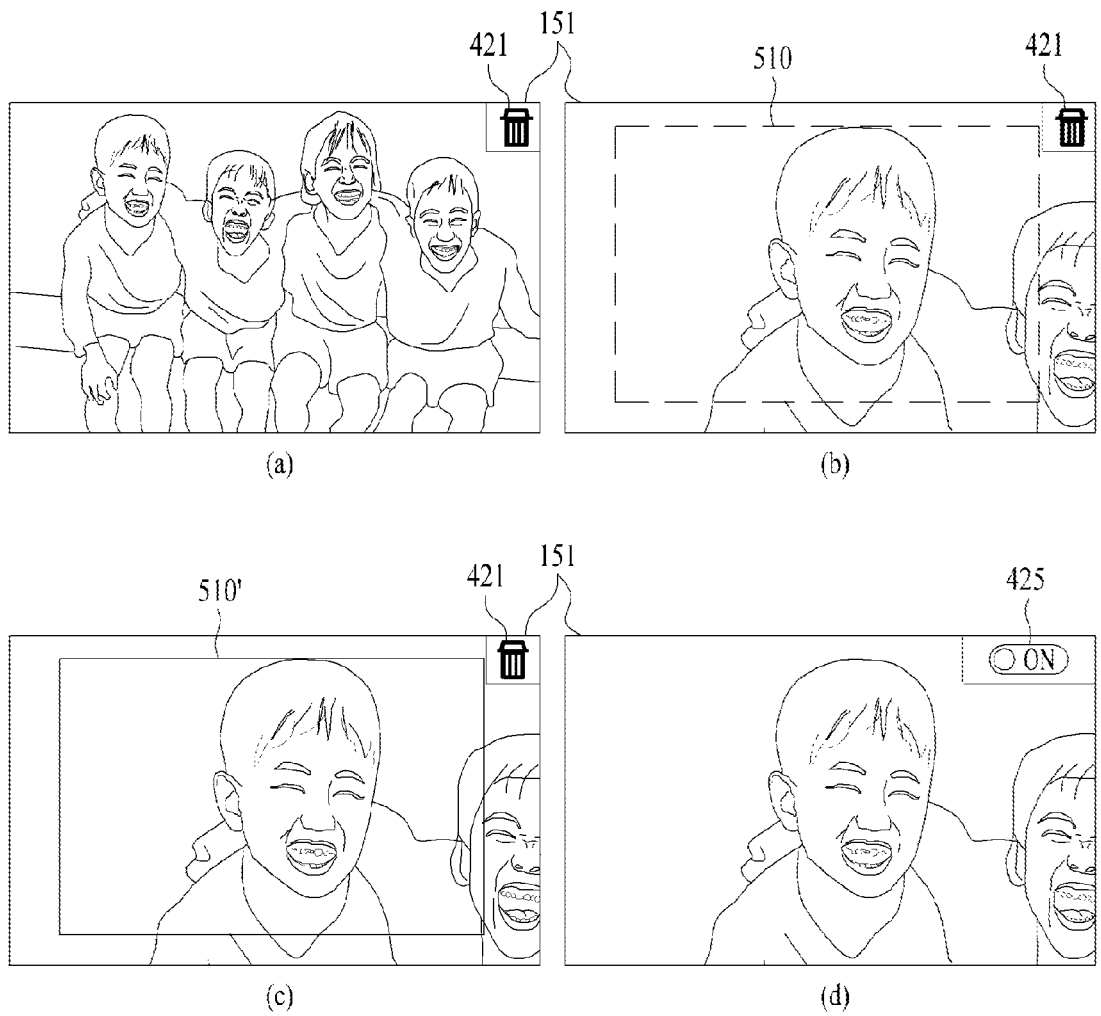
FIG. 5 is a diagram illustrating another example of a process for activating a tracing mode through an image play application in a mobile terminal according to one embodiment of the present invention.

Referring to FIG. 5, a specific image is selected and then displayed as a full screen (FIG. 5(a)). After an image display has been changed in response to a user's command input, and if there is no additional change of a display state for prescribed duration, a first step indicator 510, which indicates that a tracing mode will be activated after a while, is displayed (FIG. 5(b)).

After the indicator 510 has been displayed, and if the display state of the image is changed in a predetermined time, the first step indicator 510 may disappear. On the other hand, after the first step indicator 510 has been displayed, if the corresponding display state is maintained for predetermined duration, the first step indicator can be changed into a second step indicator 510' (FIG. 5(c)). Hence, the tracing mode is activated and an icon 425, which indicates that the tracing mode is active, is displayed (FIG. 5(d)).

Of course, the first step indicator may be directly changed into the second step indicator through the passage of time. Alternatively, the first step indicator may be gradually changed into the second step indicator through the passage of time. In addition, an indicator of a different type may be further displayed between the first step indicator and the second step indicator. The types of the indicators are just exemplary, by which the present invention is non-limited.

In the following description, a method of reviving a previously performed change of an image display state using change history information is explained in detail with reference to FIG. 6 and FIG. 7.

Figure 6:
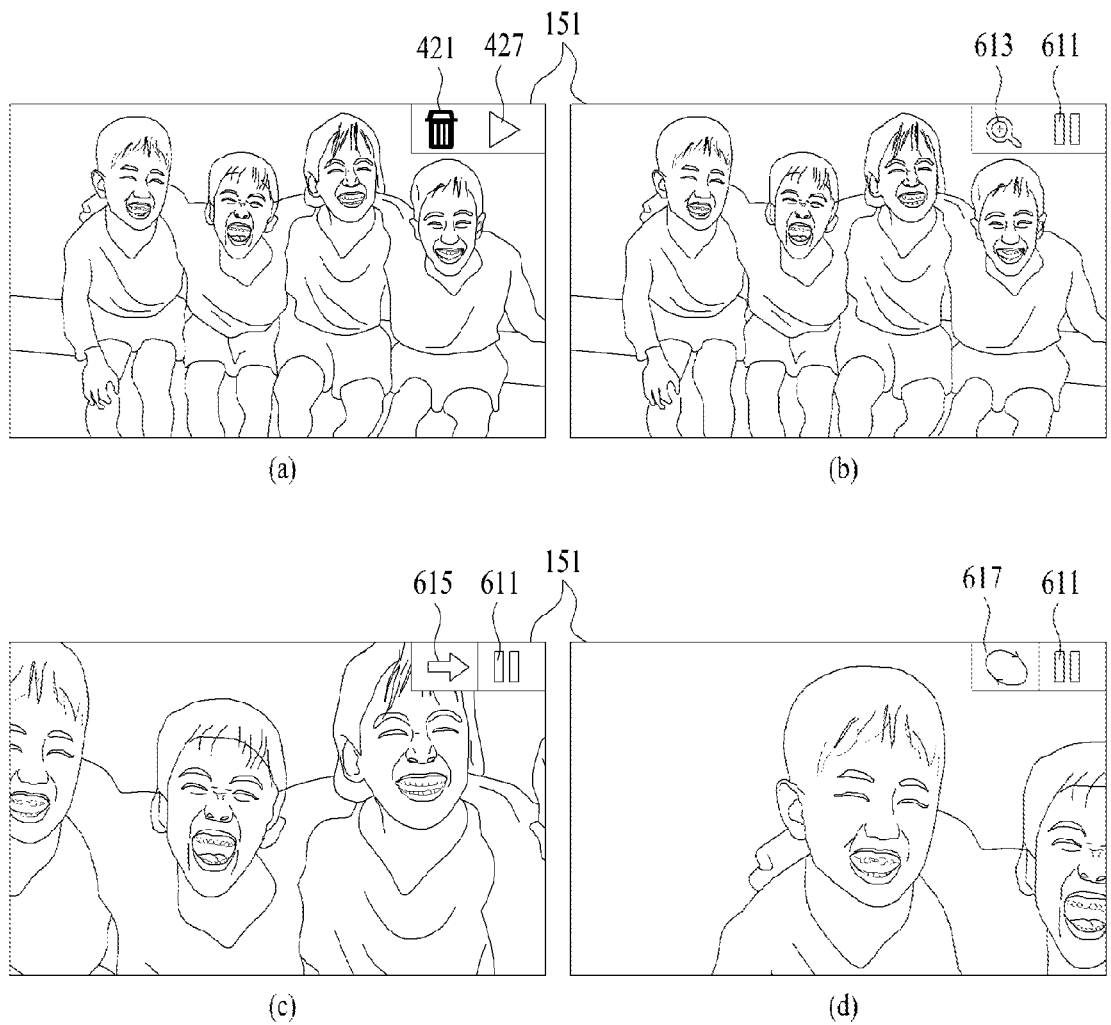
FIG. 6 is a diagram of display configuration illustrating one example of a process for reviving a previously performed change of an image display state using change history information in a mobile terminal according to one embodiment of the present invention.

In particular, FIG. 6 is a diagram of display configuration illustrating one example of a process for reviving a previously performed change of an image display state using change history information in a mobile terminal according to one embodiment of the present invention. In addition, FIG. 7 is a diagram of display configuration illustrating another example of a process for reviving a previously performed change of an image display state using change history information in a mobile terminal according to one embodiment of the present invention.

In FIG. 6, assume that the change history information is created as a result of performing the image display state change described with reference to FIG. 4. First of all, an image having change history information is selected from an image play application. For instance, if the thumbnail image 410 having the indicator 411 indicating a presence of the change history information is selected in the state shown in FIG. 4(f), and referring to FIG. 6(a), the corresponding image can be displayed as a full screen.

In doing so, a change history play icon 427 for reviving a previously performed change of an image display state is displayed on one side of the touchscreen 151. If the change history play icon 427 is selected, image display state changes, which were previously performed during an active tracing mode state as depicted in FIGS. 4(c) and 4(d), are displayed in order of the changes shown in FIGS. 6(b) to 6(d). The order of displaying the first portion and the second portion in FIGS. 6(b) to 6(d) is the same order as performed in FIGS. 4(b) to 4(d).

While the image display state changes are being revived, an icon indicating a type of a currently performed display state change and a pause icon 611 for holding the revival can be displayed. For example, the icon indicating the type of the display state change may include an enlarge icon 613 shown in FIG. 6(b), a scroll & move icon 615 shown in FIG. 6(c) or the like.

Moreover, referring to FIG. 6(d), an icon 617 for a return to an initial state can be displayed. If the revival according to the change history information is ended, a current state may return to the state shown in FIG. 6(a). If the change history play icon 427 is long touched, the change revival of the image display state can be repeatedly performed from the beginning to the end.

Meanwhile, while the change revival of the image display state is performed, referring to FIG. 7(a), a mini map and an indicator 711, which indicates that a currently displayed image corresponds to its whereabouts in a whole image, can be displayed on a prescribed region of the touchscreen 151.

Moreover, if an image having change history information exist is selected, referring to FIG. 7(b), indicators 721 and 722, each of which indicates a region (hereinafter named an interesting region) having an image display state maintained for a relatively long time, are displayed for prescribed duration and then disappear. If the indicators 721 and 722 disappear, the state shown in FIG. 6(a) can be entered.

Moreover, if the change history play icon 427 is selected, an icon for a shortcut to the interesting region can be displayed. For instance, if a next icon 733 is selected in FIG. 7(c), a next interesting region can be displayed via an optimal path (e.g., a short distance, both a scroll and a magnification change, etc.) irrespective of a user-input command for changing a display state without an intermediate process (FIG. 7(d)).

On the other hand, if a previous icon 731 is selected in the state shown in FIG. 7(d), a previous interesting region shown in FIG. 7(c) can be directly displayed. Of course, if interesting regions are set, when a revival is performed, a shift between the interesting regions can be performed in a shortest distance irrespective of a presence or non-presence of a display/selection of a next/previous icon and irrespective of whether a user inputs a specific state change command in the course of shifting from one interesting region to another interesting region in the process for creating change history information.

Figure 7:
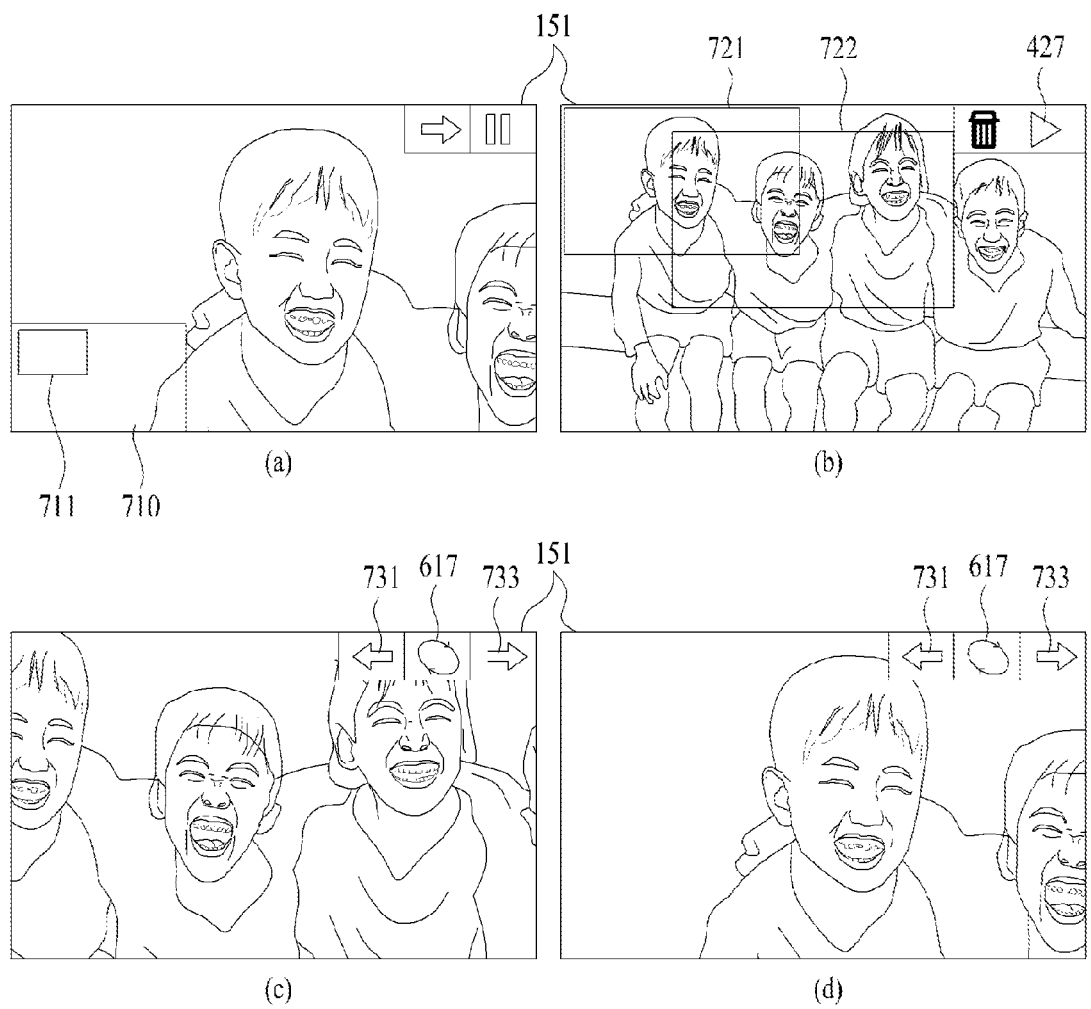
FIG. 7 is a diagram of display configuration illustrating another example of a process for reviving a previously performed change of an image display state using change history information in a mobile terminal according to one embodiment of the present invention.

Meanwhile, according to the description with reference to FIG. 6 and FIG. 7, if a thumbnail corresponding to an image having change history information is selected, the corresponding image is displayed as a full screen. If a change history play icon is selected, a revival of a previously performed display state is performed. Alternatively, the revival can be performed in a different manner.

For instance, if an image, which is to be displayed as a full screen, is selected via the indicator indicating that change history information exists (e.g., if the indicator is touched), the revival can start as soon as a full screen switching is performed. Moreover, if change history information existing image is selected, the revival can be automatically performed despite that the change history play icon 427 is not selected (i.e., a portion of a thumbnail image except the indicator is touched).

In the following description, a method of editing change history information is explained in detail with reference to FIG. 8. In particular, FIG. 8 is a diagram of display configuration illustrating one example of a process for editing change history information in the course of playback in a mobile terminal according to one embodiment of the present invention.

Figure 8:
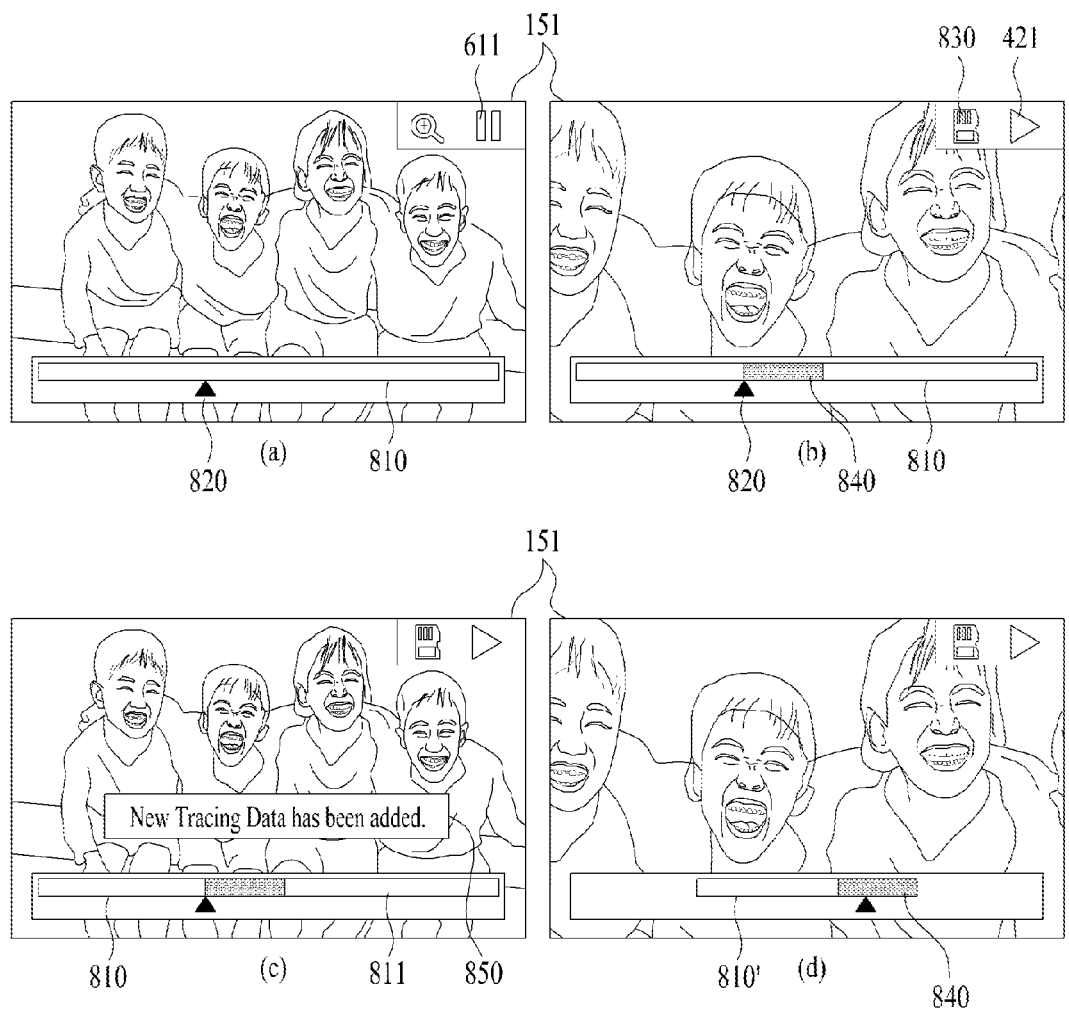
FIG. 8 is a diagram of display configuration illustrating one example of a process for editing change history information in the course of playback in a mobile terminal according to one embodiment of the present invention.

Referring to FIG. 8, while a revival of a change of an image display state is performed, a progress bar 810 corresponding to a full revival amount and an indicator 820 indicating a current view in the full revival amount can be displayed on a prescribed region of the touchscreen 151 (FIG. 8(a)). In doing so, after a pause icon 611 provided to one edge of the touchscreen 151 has been selected, if a command for a display state change is additionally input by a user, the controller 180 can display an amount 840 corresponding to the additional input on the progress bar 810 (FIG. 8(b)).

Thereafter, if a change history play icon 421 is selected, the amount 840 corresponding to the additional input disappears and the revival can be resumed from the pausing view. On the other hand, if a save icon 830 is selected, an indication message 850, which indicates that the change history information is modified, can be output (FIG. 8(c)).

Hence, a previous amount 811 after the amount 840 corresponding to the additional input is deleted from the progress bar 810 and a changed progress bar 810' can be displayed when a next change history revival (FIG. 8(d)) or the amount 840 corresponding to the additional input may be inserted into the previous amount. In this instance, the amount 840 corresponding to the additional input may be displayed by being visually discriminated from the previous amount. Moreover, an information (e.g., command input terminal/user information, change view, etc.) related to the change can be additionally displayed (not shown in the drawing).

In the following description, a method of sharing change history information is explained in detail with reference to FIG. 9. In particular, FIG. 9 is a diagram of display configuration illustrating one example of a type of sharing change history information existing image in a mobile terminal according to one embodiment of the present invention.

Figure 9:
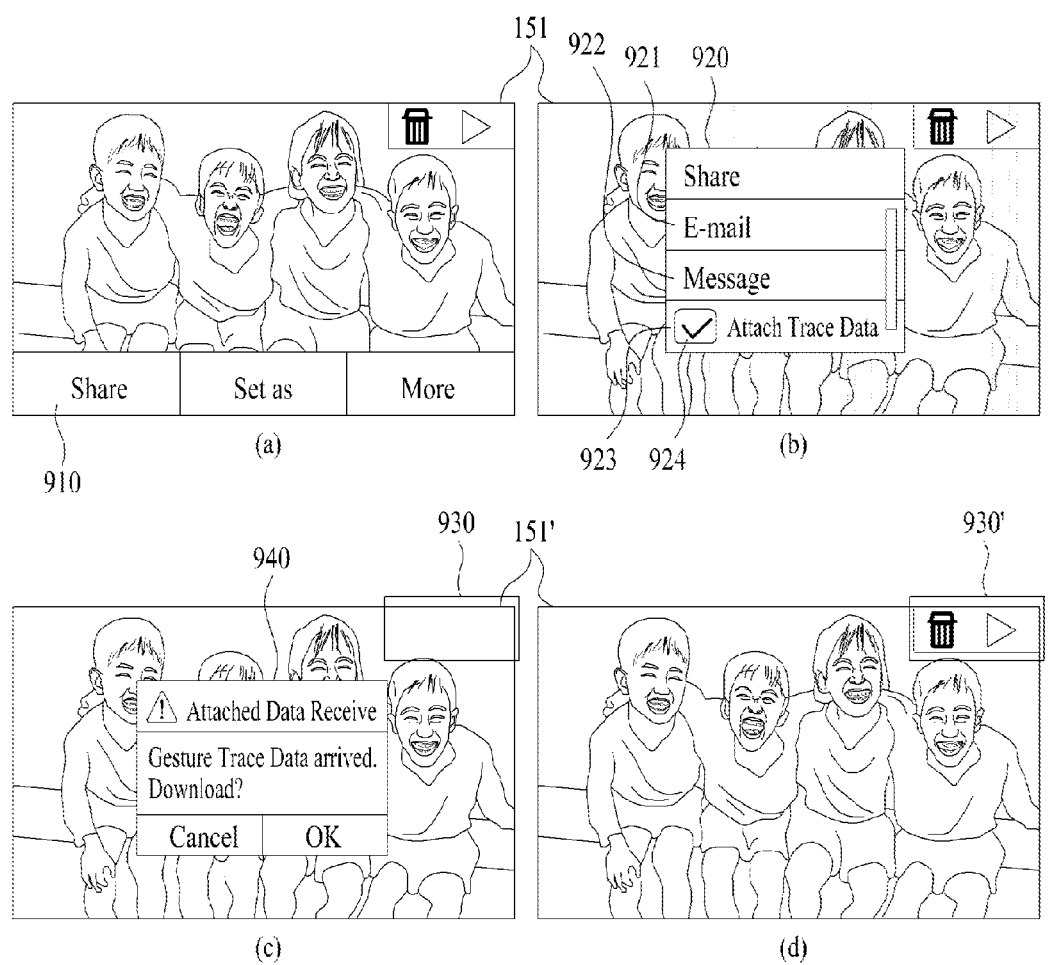
FIG. 9 is a diagram of display configuration illustrating one example of a type of sharing change history information existing image in a mobile terminal according to one embodiment of the present invention.

Referring to FIG. 9, while change history information existing image is selected and displayed as a full screen, a menu list can be displayed on a bottom end of the touchscreen 151 in response to a prescribed command input (FIG. 9(a)). If a share menu 910 is selected from the menu list, a popup window 920 including a share option can be displayed (FIG. 9(b)). In the share option, an email 921, a text message 922 and change history information item 923 can be included.

In particular, each of the email 921 and the text message 922 is a share means. The change history information item 923 is companied by a check box 924 to enable a user to select whether to send change history information together with a corresponding image. While the check box 924 is selected, if the corresponding image is sent to a different device, a received image can be displayed on a display unit 151' of the different device (FIG. 9(c)).

Moreover, a popup window 940 can be displayed to enable a user to confirm whether to receive the change history information together with the corresponding image. In FIG. 9(c), because the change history information is not applied, but a change history play icon 427 is not displayed on a prescribed side 930. If the user accepts a reception of the change history information, the change history information is received and the change history play icon 427 can be displayed on a prescribed side 930' (FIG. 9(d)).

Meanwhile, according to another embodiment of the present invention, the above-mentioned change history information is created and a revival using the created change history information is applied to a review of an image taken by photographing. As mentioned in the foregoing description, this is to resolve the problem of user's inconvenience in repeatedly checking a photographing state (e.g., a state of a focus, a state of exposure, a state of facial expression of a human subject (e.g., an interesting subject), etc.) of the same interesting subject in an image taken in a review mode right after photographing. The present method is particularly advantageous in taking a photograph of the same interesting subject in the same composition.

Figure 10:
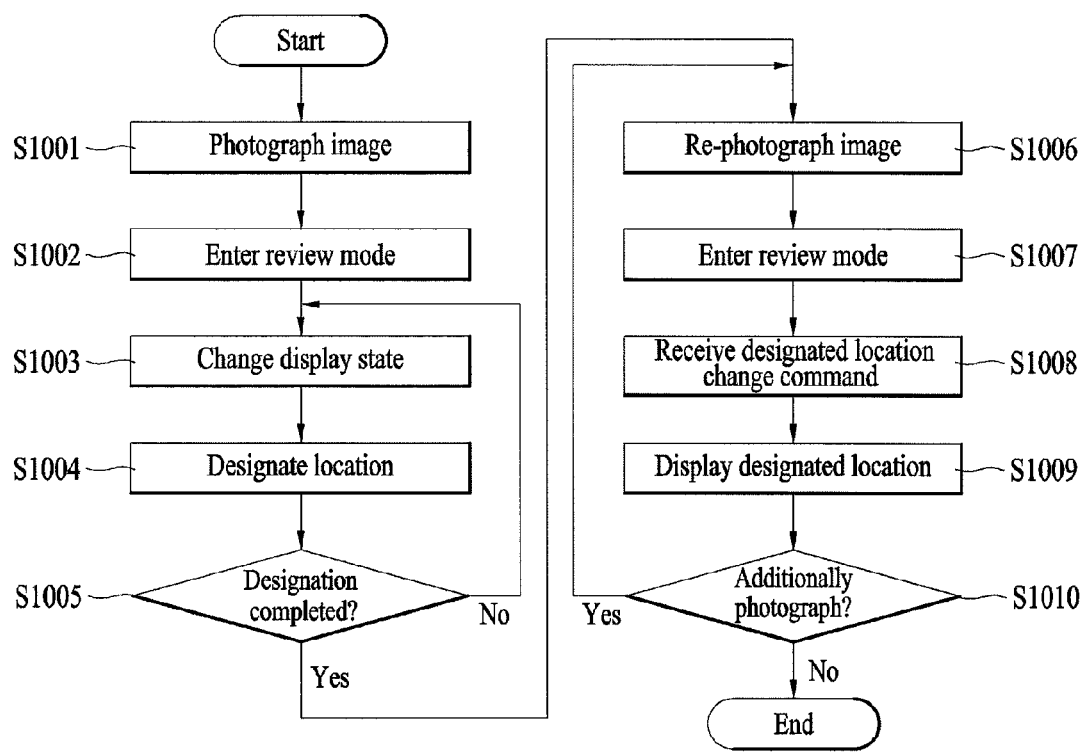
FIG. 10 is a flowchart illustrating one example of an image taking procedure using a location designation of a review mode in a mobile terminal according to another embodiment of the present invention.

Next, FIG. 10 is a flowchart illustrating one example of an image taking procedure using a location designation of a review mode in a mobile terminal according to another embodiment of the present invention. Referring to FIG. 10, an image taking can be performed in a photographing mode using the camera 121 (S1001).

The photographed image can be displayed as a review mode is entered (S1002). In the review mode, a user can change a display state of the photographed image into one of enlarge, reduce, scroll, rotate and the like in a situation of facilitating an interesting subject to be checked (S1003). The changed image display state can be saved in response to a prescribed command input (S1004).

In this instance, 'changing the image display state' may mean that a specific location on an image, i.e., a display location is designated because the specific location on the image is displayed by a specific magnification. When at least interesting subjects exist, the steps S1003 and S1004 can be repeatedly performed. Once the designation of the display location is completed (S1005), an image re-photographing can be performed (S1006).

Preferably, the re-photographing may be performed by photographing the same subject at the same angle of view. The re-photographed image can be displayed if a review mode is entered (S1007). In the review mode, a user can input a command for a state into the location designated in the step S1004 (i.e., changing into a saved display state) S1008).

When the re-photographing is performed to photograph the same subject at the same angle of view, as an image display state is changed to display the designated location (S1009), the same interesting subject in the previous photographing can be displayed in the review mode. As a result of the check in the review mode, if the interesting subject is not satisfactorily photographed, the user can repeat the steps S1006 to S1007 until the interesting subject is satisfactorily photographed (S1010).

Figure 11:
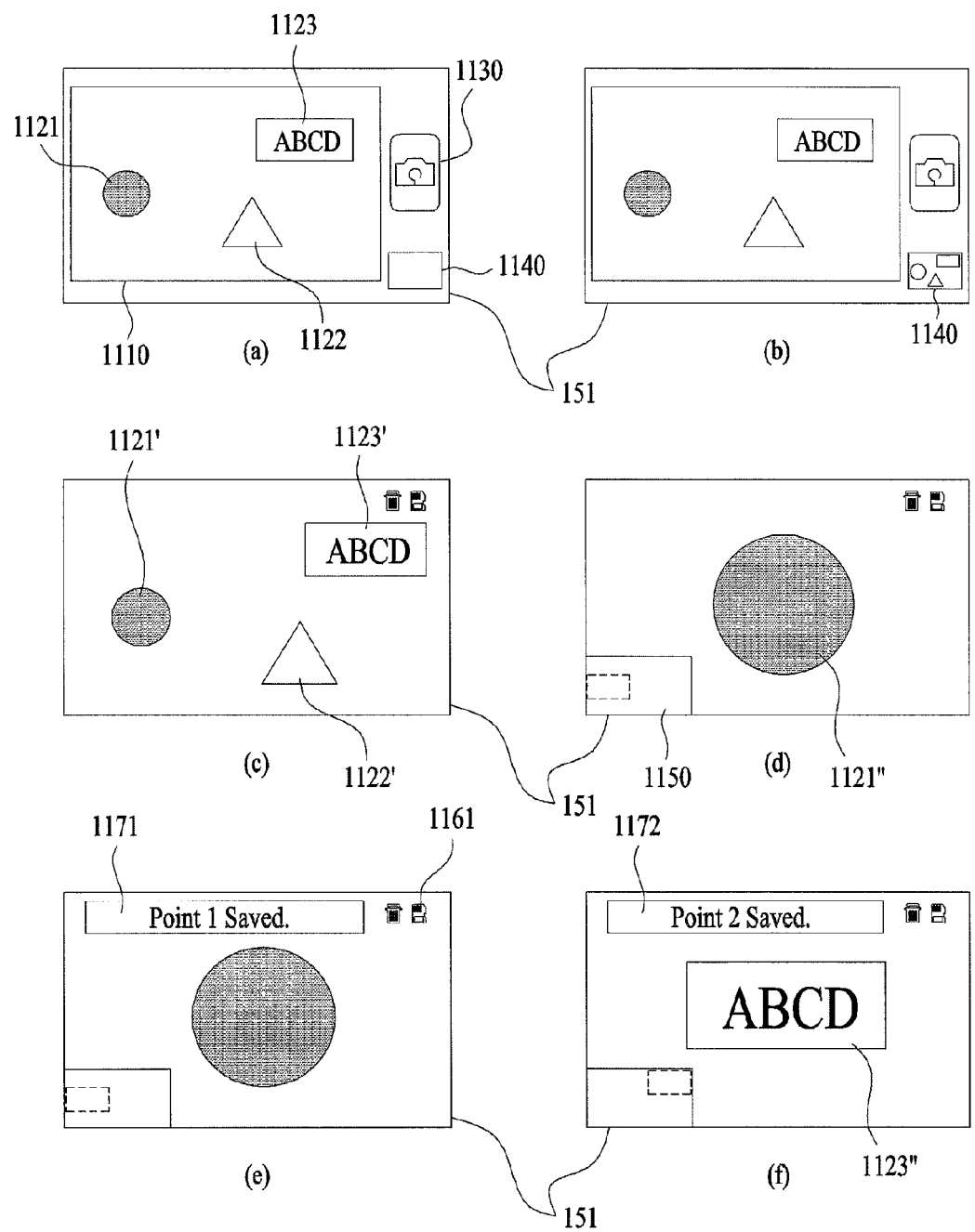
FIG. 11 is a diagram of display configuration illustrating one example of a process for designating a location of a review mode in a mobile terminal according to another embodiment of the present invention.

In the following description, a procedure for directly moving to a designated location in an image re-photographed after the location designation in a review image is explained in detail with reference to FIG. 11 and FIG. 12. In particular, FIG. 11 is a diagram of display configuration illustrating one example of a process for designating a location of a review mode in a mobile terminal according to another embodiment of the present invention.

Referring to FIG. 11(a), a preview image 1110 can be displayed on the touchscreen 151 in a photographing mode. Assume a situation in which a circular subject 1121, a triangular subject 1122 and a quadrangular subject 1123 are displayed in the preview image 1110. In this instance, assume that the user's interesting subjects include the circular subject 1121 and the quadrangular subject 1123.

If the user selects a shutter icon 1130, an image photographing is performed. Referring to FIG. 11(b), a thumbnail of the photographed image can be displayed on a prescribed region 1140 on the touchscreen 151. If the region 1140 of displaying the thumbnail of the photographed image is selected, as a review mode is selected, referring to FIG. 11(c), the photographed image can be displayed on the touchscreen.

In doing so, if the user intends to check a photographed state of the interesting subjects including the circular subject 1121' and the quadrangular subject 1123' except the triangular subject 1122' in detail, referring to FIG. 11(d), the user scrolls the circular subject 1121" to be situated at a screen center and may then input a display state change command for increasing a magnification. As the display state change command is input, a mini map 1150 indicating a current location in a full image can be displayed on a prescribed region on the touchscreen 151.

In doing so, if the user selects a save icon 1161, referring to FIG. 11(e), the corresponding location (i.e., a current image display state) can be saved and an indication message 1171 indicating that the location has been saved can be displayed. Moreover, referring to FIG. 11(f), the user inputs a display state change command to view a next interesting subject (i.e., the quadrangular subject 1123") in detail and can then save the corresponding location by selecting a save icon 1161.

Hence, an indication message 1172 indicating that a second location has been saved can be displayed. Information on the designated location may include coordinates information of the corresponding location and magnification information. Alternatively, the information on the designated location may include the command itself input by the user to change a display state. Alternatively, the information on the designated location may include a combination of the two former configurations.

If the location designation is completed, the user ends the review mode and may control a current mode to return to the photographing mode. A process for checking a previously designated location in reviewing an image re-photographed after the return to the photographing mode is described in detail with reference to FIG. 12 as follows.

Figure 12:
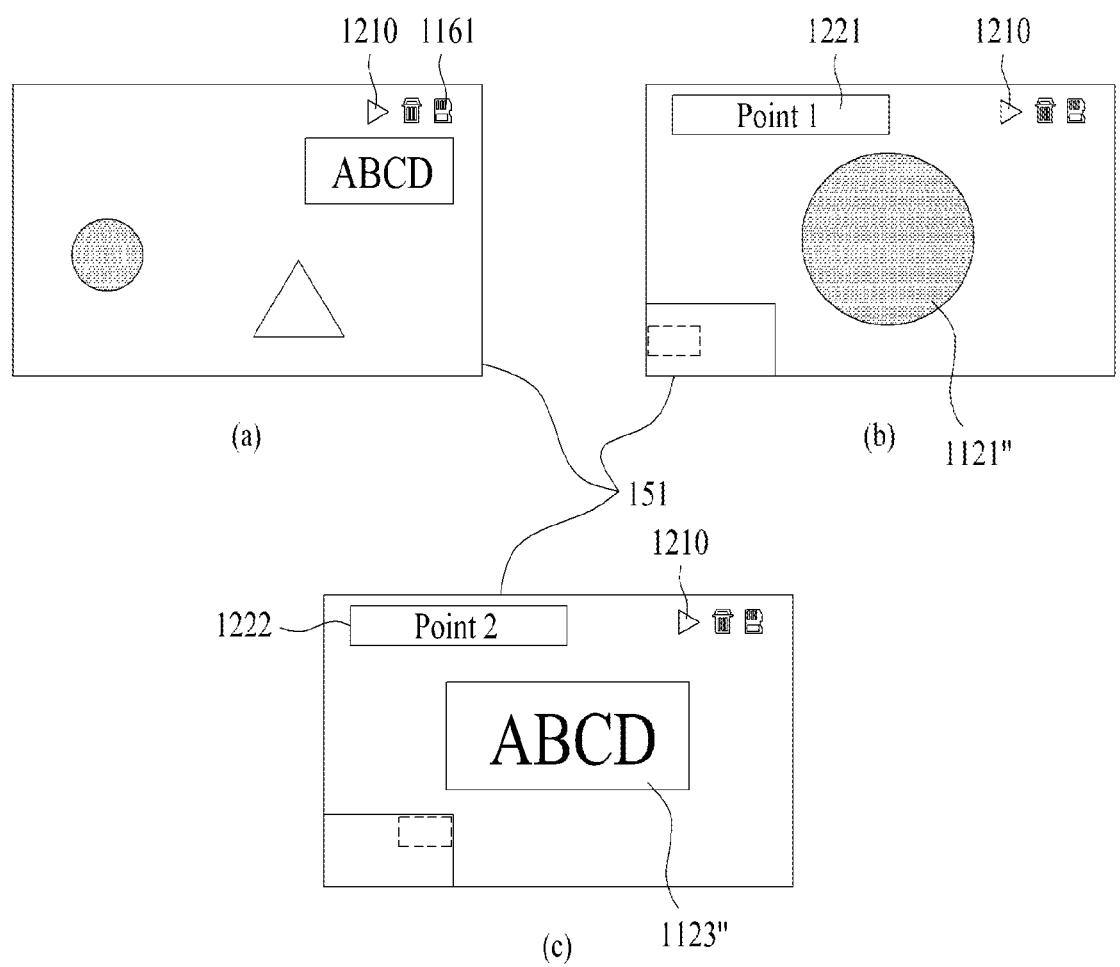
FIG. 12 is a diagram of display configuration illustrating one example of a method of checking a designated location of a review mode in a mobile terminal according to another embodiment of the present invention.

FIG. 12 is a diagram of display configuration illustrating one example of a method of checking a designated location of a re-photographed image in a review mode in a mobile terminal according to another embodiment of the present invention. In FIG. 12, assume a situation that the subject photographed in FIG. 11 is re-photographed in the same composition. After the re-photographing has been finished, the review mode can be re-entered to check the re-photographed image.

The entry into the review mode may be performed if the region 1140 of displaying the thumbnail of the photographed image shown in FIG. 11(b) is selected. Alternatively, the entry into the review mode may be performed through a menu manipulation of a different type.

Referring to FIG. 12(a), because there is the information on the location designated in the initial photographing, unlike the initial photographing, a location shift icon 1210 can be displayed in addition. If the location shift icon 1210 is selected for the first time, referring to FIG. 12(b), an image display state is changed into the designated location initially saved in the situation of the initial photographing with displaying location indicator 1221.

Because the same subject is photographed in the same composition, the re-photographed image can be finally displayed on the touchscreen in a manner that the circular subject 1121" of the re-photographed image can be viewed in detail (i.e., the circular subject 1121" is displayed at the center of the touchscreen). If the location shift icon 1210 is selected again, referring to FIG. 12(c), the image display state is changed into the designated location secondly saved in the situation of the initial photographing with displaying location indicator 1222.

Because the same subject is photographed in the same composition, the re-photographed image can be finally displayed on the touchscreen in a manner that the quadrangular subject 1123" of the re-photographed image is displayed at the center of the touchscreen.

In order to check the interesting subject in the re-photographed image in detail by the above-mentioned method, the user can simply select the location shift icon instead of re-inputting the display state change commands one by one. Of course, if a composition is changed or a different subject is photographed, the user changes an image display state in the situation shown in FIG. 12(a) and can then save a newly designated location by selecting the save icon 1161 again.

Meanwhile, according to the description with reference to FIG. 10 and FIG. 11, the save icon is selected to save the designated location, by which the present embodiment is non-limited. In addition, the designated location saving process can be replaced by the tracing mode of saving an input location change command history according to one embodiment of the present invention.

In this instance, the process for displaying the designated location in reviewing the re-photographed image can correspond to the revival process according to the location change command history. In particular, the controller 180 automatically saves such a display state change command, which is input by a user in a review mode after an initial image photographing, as enlarge, reduce, scroll and the like. After a re-photographing has been performed in a similar environment, when a review mode is entered, the controller 180 can apply a previous user display state change command in response to a revival command input or automatically.

Moreover, a path optimization may be applicable to a revival process. In particular, in order to search a photographed image for an interesting subject (or to display a designated location), a user may experience trials and errors (e.g., scroll, enlarge, reduce, etc.) several times. Thereafter, when the user reviews a re-photographed image, it is unnecessary to revive the previous trial and error process.

Hence, the controller 180 recognizes a location of a last arrival or a target point, which is checked for a pause of a specific time, as a designated location and then naturally moves to a corresponding object naturally or saves a last displayed display state (location) only. By this method, when a reviewing is performed after re-photographing, the controller 180 modifies a complicated moving path to the recognized designated location, thereby changing a display state into a final location naturally.

Recently, the camera module 121 supports a burst mode in general. In this instance, the burst mode means a mode of photographing an image consecutively as many times as a prescribed count. In this instance, since it is difficult to instantly review the photographed image after each photographing, images at a designated location can be collectively displayed after completion of the burst-mode photographing. This process is described with reference to FIG. 13 as follows.

Figure 13:
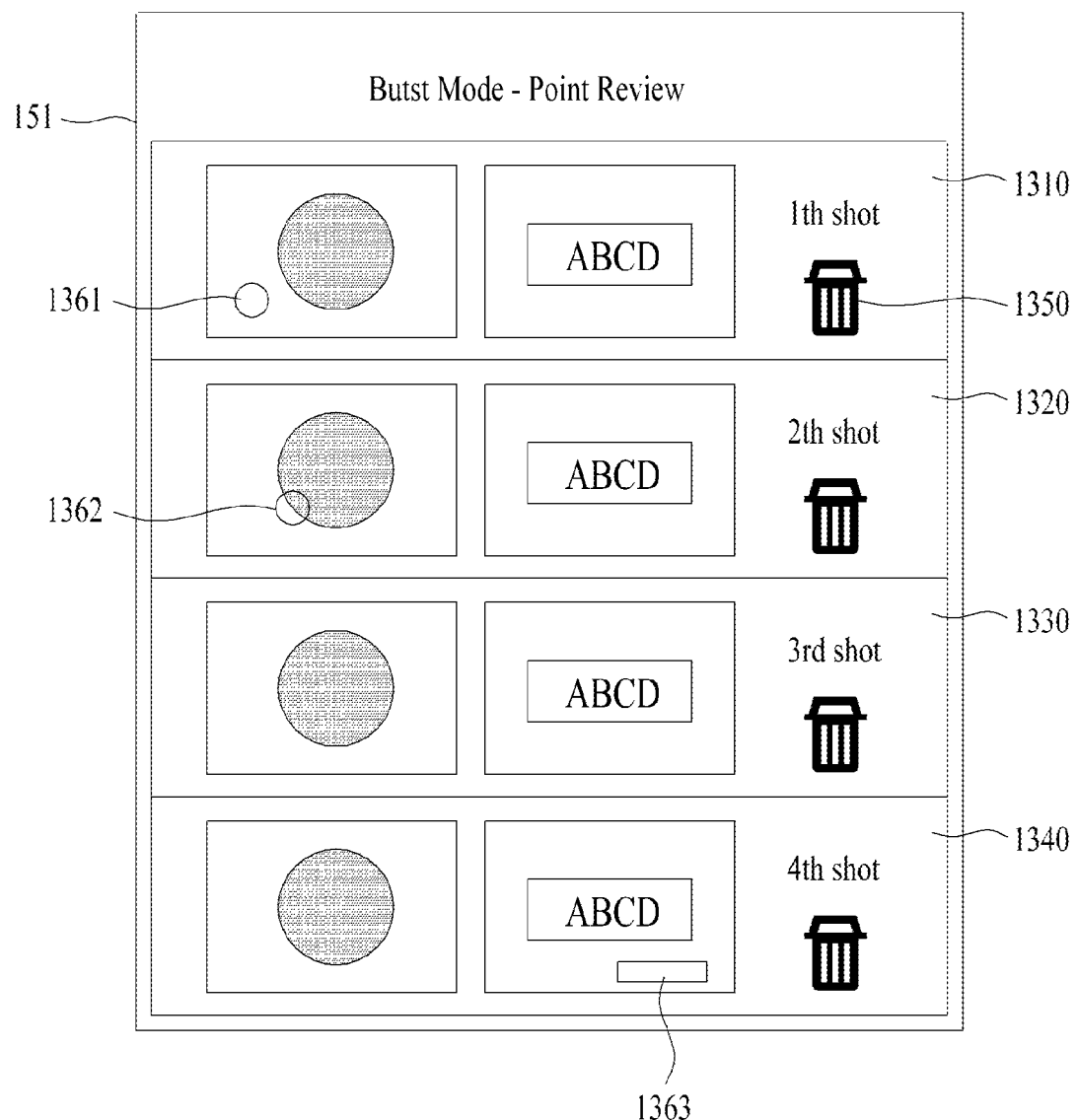
FIG. 13 is a diagram of display configuration illustrating one example of a method of collectively checking a review mode designated location in performing a photographing in a burst mode in a mobile terminal according to another embodiment of the present invention.

In particular, FIG. 13 is a diagram of display configuration illustrating one example of a method of collectively checking a review mode designated location in performing a photographing in a burst mode in a mobile terminal according to another embodiment of the present invention. In FIG. 13, assume a situation that a re-photographing is performed by applying a burst mode after two locations have been designated in a review mode after completion of an initial photographing by the above-mentioned process described with reference to FIG. 11. In addition, assume that a burst count in a burst mode is 4.

Referring to FIG. 13, once a burst-mode re-photographing is completed, the controller 180 can enter a review mode corresponding to a burst mode automatically or in response to a review mode enter command. In the review mode corresponding to the burst mode, regions 1310, 1320, 1330 and 1340 can be discriminated per photographing round from each other.

In addition, objects corresponding to designated locations in the images photographed in the corresponding rounds can be displayed in the regions, respectively. In this instance, a user can check unwanted subjects 1361, 1362 and 1363 around an interesting subject at a time. As a result of the check, if the user intends to save the image photographed in the 3$^{rd}$ round only, the user can delete the unwanted images by selecting trash icons 1350 provided to the regions 1310, 1320 and 1340 corresponding to the rest of the rounds, respectively. On the other hand, if a save icon is provided instead of the trash icon 1350, the image of the save icon selected round can be saved only.

The photographed image reviewing method described with reference to FIGS. 10 to 13 is explained on the assumption of a mobile terminal, by which the present invention is non-limited. In addition, the present embodiments are also applicable to a digital camera that provides a photographing function only.

Moreover, although the above embodiments are described on the assumption of still images, by which the present invention is non-limited. In addition, the present invention is applicable to a video or moving images. For instance, while playing a video, after the video playback pauses in a random play point, if a user inputs such a display state change command as enlarge, reduce, shift and the like to a frame displayed in a pause state, the corresponding command and/or a display state under the corresponding command can be saved and shared. Moreover, the video playback can be resumed from the pause part while the corresponding display state is maintained.

Meanwhile, in the present specification, such a configuration of a graphic user interface (UI) as key buttons, icon shapes, arrangement forms and the like are exemplarily provided, by which the present invention is non-limited. In addition, it is apparent to those skilled in the art that the present invention is applicable to various GUI configurations. Moreover, although the above embodiments of the present invention are described on the assumption of still images, the aforementioned change history information on a video or moving images is created to revive the display state change.

Accordingly, the present invention provides the following effects and/or features. First of all, a user can view an image more conveniently via the above-configured image displaying apparatus according to at least one embodiment of the present invention.

Particularly, the present invention saves a history of changing an image display state, thereby reviving the display state change using the saved history in re-viewing the same image. Secondly, when the same subject is repeatedly photographed, the present invention designates a location of an interesting subject in a review mode, thereby facilitating a photographed state of the interesting subject to be checked in re-photographing.

It will be apparent to those skilled in the art that various modifications and variations can be specified into other form(s) without departing from the spirit or scope of the inventions.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. Embodiments can also be combined.

What is claimed is:

1. A method of controlling an image display device, the method comprising:

displaying, via a display unit of the image display device, a plurality of thumbnails;

in response to selection of one of the plurality of thumbnails, displaying an image corresponding to the selected thumbnail, via the display unit of the image display device, and activating a tracing mode, wherein the image is displayed as a full screen;

receiving an input via a user input unit to change a state of the displayed full screen image;

changing, via a controller of the image display device, the state of the displayed full screen image including one of enlarging the displayed image, reducing the displayed image, scrolling the displayed image and rotating the displayed image to display a first changed display state of the image;

receiving an input via a user input unit to change a displayed state of the first changed display state of the image;

changing, via the controller, the displayed state of the first changed display state of the image including one of enlarging the displayed image, reducing the displayed image, scrolling the displayed image and rotating the displayed image to display a second changed display state of the image;

saving, via the controller, the one of the enlarging, reducing, scrolling and rotating associated with the displayed first changed display state of the image and associated with the displayed second changed display state of the image as history information of the changed state of the displayed image in a memory associated with the image display device in response to displaying the image as the full screen again to end the tracing mode after the state of the displayed image is changed;

receiving, via the controller, a revival command for the image corresponding to the selected thumbnail; and in response to reception of the revival command, reviving the changed state of the displayed image in accordance with the saved history information on the display unit, wherein the history information is only saved while the tracing mode is active, and wherein the tracing mode is activated if a mode activate command is input or if a display state of the displayed image is changed in response to a random display state change command and then maintained for a prescribed duration.

2. The method of claim 1, wherein the saved history information includes at least one of display coordinates of the changed state of the displayed image and a display magnification of the changed state of the displayed image.

3. The method of claim 1, wherein the display unit comprises a touchscreen,
wherein the input includes a touch and drag on the displayed image, and
wherein the history information includes changes made to the state of the displayed image based on the touch and drag.

4. The method of claim 1, further comprising:
transmitting, via a wireless communication unit of the image display device, the image and the saved history information.

5. The method of claim 1, wherein the revival command includes selecting the image from an image list after the history information is saved.

6. The method of claim 1, wherein the image includes an image photographed via a camera,
wherein the image is displayed in a review mode, and
wherein the revival command includes a command for entering the review mode after performing an additional photographing via the camera.

7. An apparatus for displaying an image, comprising:
a display unit; and
a controller configured to:
display a plurality of thumbnails on the display unit;
in response to selection of one of the plurality of thumbnails, display an image corresponding to the selected thumbnail on the display unit and activate a tracing mode, wherein the image is displayed as a full screen;
change a state of the displayed full screen image including one of enlarging the displayed image, reducing the displayed image, scrolling the displayed image and rotating the displayed image to display a first changed display state of the image;
change the displayed state of the first changed display state of the image including one of enlarging the displayed image, reducing the displayed image, scrolling the displayed image and rotating the displayed image to display a second changed display state of the image;
save the one of the enlarging, reducing, scrolling and rotating associated with the displayed first changed display state of the image and associated with the displayed second changed display state of the image as history information of the changed state of the displayed image in a memory associated with the apparatus in response to displaying the image as the full screen again to end the tracing mode after the state of the displayed image is changed;
receive a revival command for the image corresponding to the selected thumbnail; and
in response to reception of the revival command, revive the changed state of the displayed image in accordance with the saved history information on the display unit,
wherein the controller is further configured to only save the history information while the tracing mode is active, and
wherein the tracing mode is activated if a mode activate command is input or if a displayed state of the image is changed in response to a random display state change command and then maintained for a prescribed duration.

8. The apparatus of claim 7, wherein the saved history information includes at least one of display coordinates of the changed state of the displayed image and a display magnification of the changed state of the displayed image.

9. The apparatus of claim 7, wherein the display unit comprises a touchscreen,
wherein the input includes a touch and drag on the displayed image, and
wherein the history information includes changes made to the state of the displayed image based on the touch and drag.

10. The apparatus of claim 7, further comprising:
a wireless communication unit configured to transmit the image and the saved history information.

11. The apparatus of claim 7, wherein the revival command includes selecting the image from an image list after the history information is saved.

12. The apparatus of claim 7, wherein the image includes an image photographed via a camera, and
wherein the controller is further configured to display the image in a review mode, and
wherein the revival command includes a command for entering the review mode after performing an additional photographing via the camera.

13. The apparatus of claim 7, wherein in response to reception of the revival command, the state of the displayed full screen image is scrolled out from the specific area while the displayed first state of the image is scrolled into the specific area.

14. The apparatus of claim 13, wherein a direction of the scrolling is determined according to the history information.

* * * * *